(12) United States Patent
Jin et al.

(10) Patent No.: US 7,982,841 B2
(45) Date of Patent: Jul. 19, 2011

(54) METHOD FOR MANUFACTURING LIQUID CRYSTAL DISPLAY DEVICE

(75) Inventors: Hyun Suk Jin, Anyang-si (KR); Hyung Seok Jang, Seongnam-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/758,536

(22) Filed: Apr. 12, 2010

(65) Prior Publication Data

US 2010/0197189 A1    Aug. 5, 2010

Related U.S. Application Data

(62) Division of application No. 11/446,162, filed on Jun. 5, 2006, now Pat. No. 7,728,941.

(30) Foreign Application Priority Data

Dec. 28, 2005   (KR) .......................... 10-2005-0131564

(51) Int. Cl.
*G02F 1/1343* (2006.01)
*G02F 1/13* (2006.01)

(52) U.S. Cl. ......... 349/141; 349/139; 349/143; 349/187

(58) Field of Classification Search .................. 349/141, 349/143, 189, 187
See application file for complete search history.

(56) References Cited

U.S. PATENT DOCUMENTS

| 6,040,886 | A | 3/2000 | Ota et al. |
| 7,436,472 | B2 | 10/2008 | Baek |
| 7,692,750 | B2 * | 4/2010 | Jang et al. ..................... 349/141 |
| 2005/0094077 | A1 | 5/2005 | Baek |
| 2005/0134788 | A1 | 6/2005 | Park |

FOREIGN PATENT DOCUMENTS

| JP | 9-325346 | 12/1997 |
| JP | 11-030783 | 2/1999 |
| JP | 2002-365657 | 12/2002 |
| JP | 2004-354407 | 12/2004 |
| JP | 2005-182067 | 7/2005 |
| JP | 2007-079525 | 3/2007 |
| JP | 2007-178948 | 7/2007 |
| TW | 200702860 | 1/2007 |

* cited by examiner

*Primary Examiner* — Dung T. Nguyen (74) *Attorney, Agent, or Firm* — McKenna Long & Aldridge LLP (57) ABSTRACT

A liquid crystal display device employs a white sub-pixel among RGBW-4 sub-pixels as a view control component to realize a narrow viewing angle or a wide viewing angle in a fringe field switching mode. The LCD device comprises gate lines and data lines crossing each other to define RGBW sub-pixels on a first substrate, a thin film transistor formed at each crossing of the gate and data lines; a first common electrode in each region of the RGBW sub-pixels, a pixel electrode connected to the thin film transistor and insulated from the first common electrode, the pixel electrode having at least one slit, a second substrate attached to the first substrate, wherein the first and second substrate face each other with a liquid crystal layer interposed therebetween, and a second common electrode on the second substrate and corresponding to each W sub-pixel.

9 Claims, 11 Drawing Sheets

METHOD FOR MANUFACTURING LIQUID CRYSTAL DISPLAY DEVICE

CROSS-REFERENCE TO RELATED APPLICATIONS

This application is a Divisional of application Ser. No. 11/446,162 filed Jun. 5, 2006 now U.S. Pat. No. 7,728,941, now allowed, which claims priority to Korean Patent Application No. 10-2005-0131564, filed Dec. 28, 2005, all of which are hereby incorporated by reference for all purposes as if fully set forth herein.

BACKGROUND OF THE INVENTION

1. Field of the Invention

The present invention relates to a liquid crystal display (LCD) device, and a method for manufacturing the same. More particularly, the present invention relates to a liquid crystal display device that employs a white sub-pixel among RGBW-4 sub-pixels as a view control component to realize a narrow viewing angle as well as a wide viewing angle in a fringe field switching mode, and a method for manufacturing the same.

2. Discussion of the Related Art

In recent years, rapid advances in the performance of an active matrix liquid crystal display ("LCD") device have resulted in various applications of the LCD device, such as screens for flat panel TVs, and monitors for portable computers.

Among the active matrix LCD devices, a twisted nematic (TN) type LCD device is widely used. The TN type LCD device refers to an LCD device wherein, with liquid crystals arranged to have liquid crystal director twisted 90 degrees between two substrates, each having an electrode, the liquid crystal director is driven via application of a voltage to the electrodes.

Although the TN type LCD device has been spotlighted in terms of its excellent contrast and color reproducibility, it suffers from a significant problem in that it has a narrow viewing angle.

In order to solve the problem of the TN type LCD device having the narrow viewing angle, a fringe field switching ("FFS") mode type LCD device has been introduced, wherein a counter electrode and a pixel electrode are formed of a transparent conductor, and are spaced apart by a narrow distance to allow liquid crystal molecules to be operated by a fringe field created between the counter electrode and the pixel electrode.

The FFS mode type LCD device will be described in detail hereinafter.

Figure 1:
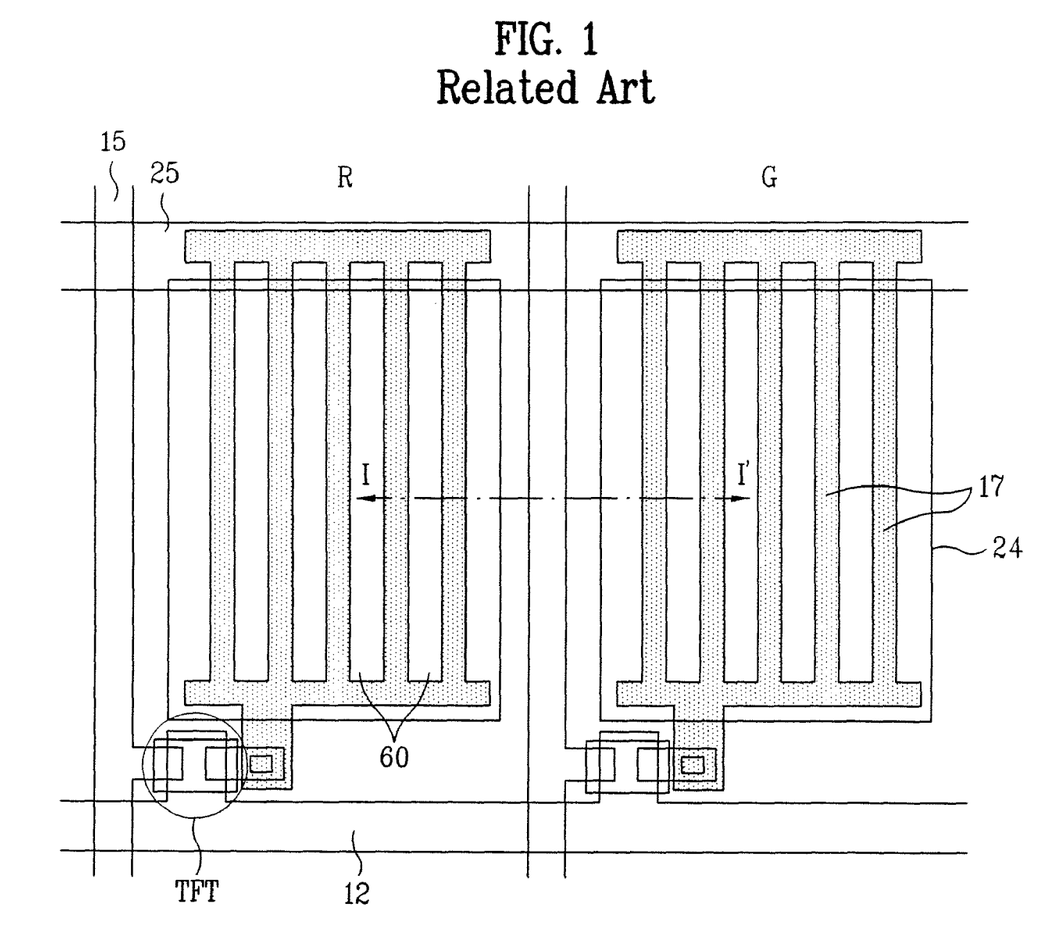
FIG. 1 is a plan view illustrating a related art FFS mode type liquid crystal display device.
Figure 2:
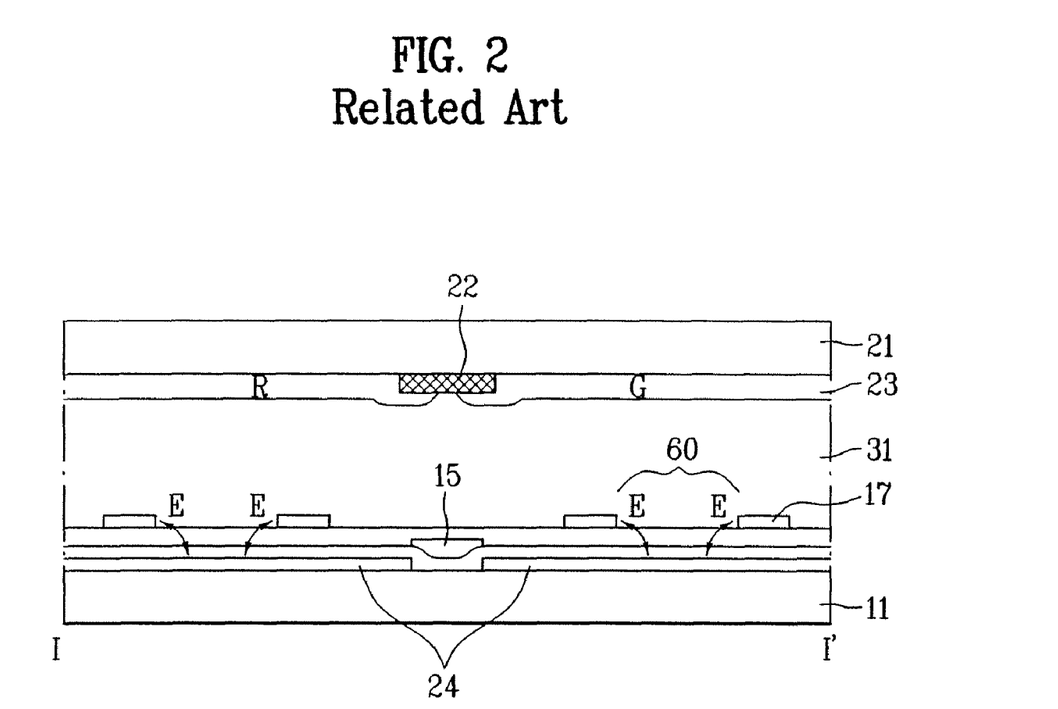
FIG. 2 is a cross-sectional view taken along line I-I' of FIG. 1.

FIG. 1 is a plan view illustrating a related art FFS mode type liquid crystal display device, and FIG. 2 is a cross-sectional view taken along line I-I' of FIG. 1.

In FIGS. 1 and 2, the related art FFS mode type LCD device comprises a TFT array substrate 11, which is formed thereon with gate lines 12 and data lines 15, formed of metal, crossing each other to define sub-pixels, a common line 25 disposed in parallel to the gate line 12, a thin film transistor formed at each crossing portion of the gate and data lines to act as a switching element to switch a voltage on/off, and a counter electrode 24 and a pixel electrode 17 formed of a transparent metal in each sub-pixel while being isolated from each other via a dielectric layer so as to overlap with each other; Here, the counter electrode 24 is brought into contact with the common line 25.

More specifically, the counter electrode 24 is formed in a plate shape within each sub-pixel, and the pixel electrode 17 is divided into plural sub-pixel electrodes in a direction of the data lines to define slits 60 between the sub-pixel electrodes. Here, when a $V_{com}$ signal is applied to the counter electrode 24, and a pixel signal is applied to the pixel electrode 17 through the thin film transistor, a fringe field is generated between the counter electrode 24 and the pixel electrode 17.

Each of the slits 60 has a width of about 2-6 gm, and liquid crystals are driven by the fringe field generated between the counter electrode 24 and the pixel electrode 17. In other words, when voltage is not applied, the liquid crystals are rotated from an initial orientation by the fringe field E via rubbing, and allow light to be transmitted therethrough.

Meanwhile, a color filter array substrate 21 is assembled opposite the TFT array substrate 11 with a liquid crystal layer 31 interposed therebetween, in which the color filter array substrate 21 comprises RGB-color filter layers 23 arranged in a predetermined pattern to realize red, green and blue colors, and black matrices 22 to partition the RGB-color filter layers from each other while shielding light.

The color filter layers 23 are formed such that respective sub-pixels have their own single pigment and are independently driven to exhibit color of one pixel via combination thereof.

The RGB-color filter layers 23 in the LCD device can be arranged in a stripe type, a mosaic type, a delta type, a quad type, and the like according to an arranging manner of the layers, and can be arranged in various arrays according to the size of a liquid crystal display panel, shape of the color filter, and color arrangement.

Such a related art liquid crystal display device has problems as follows.

For the related art FFS mode type LCD device, it is necessary to enable easy conversion between a narrow viewing angle and a wide viewing angle in order to prevent private information of an user from being seen by other persons near the user. To this end, a view control layer can be additionally formed in the device, or a view control electrode can be additionally formed on the overall upper plate to control the viewing angle. However, these techniques have some problems as follows. First, the view control effect is insignificant. Secondly, enlargement in the range of the electrode structure modified or added to increase the view control effect is very disadvantageous in view of an aperture ratio. Thirdly, a front contrast ratio (CR) can also be significantly reduced upon the narrow viewing angle.

The most important problem of these techniques is in a complicated driving method due to insertion of the additional electrode layer and application of signals.

SUMMARY OF THE INVENTION

Accordingly, the present invention is directed to a liquid crystal display device and a method for manufacturing the same that substantially obviates one or more problems due to limitations and disadvantages of the related art.

An advantage of the present invention is to provide a liquid crystal display device that can realize a narrow viewing angle in addition to a wide viewing angle in a fringe field switching (FFS) mode in such a way of allowing a white sub-pixel among RGBW-4 sub-pixels to be driven in the same FFS mode as that of the adjacent RGB sub-pixels for the wide viewing angle while being driven to form a vertical electric field different from that of the adjacent RGB sub-pixels only for the narrow viewing angle, and a method for manufacturing the same.

Additional advantages and features of the invention will be set forth in part in the description which follows and in part will become apparent from the descriptions or may be learned by practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a liquid crystal display device, comprising: gate lines and data lines crossing each other to define RGBW sub-pixels on a first substrate; a thin film transistor formed at each crossing of the gate and data lines; a first common electrode formed in each region of the RGBW sub-pixels; a pixel electrode connected to the thin film transistor and insulated from the first common electrode, the pixel electrode having at least one slit attached to the first substrate, wherein the first and second substrates face each other with a liquid crystal layer interposed therebetween; and a second common electrode formed on the second substrate and corresponding to each W sub-pixel.

In accordance with another aspect of the present invention, there is provided a method for manufacturing a liquid crystal display device, comprising: forming first common electrodes on a first substrate; forming gate lines and data lines to cross each other to define RGBW sub-pixels on the first substrate; forming a thin film transistor at each crossing of the gate and data lines; forming a passivation layer on an overall surface of the first substrate including the thin film transistor; forming pixel electrodes on the passivation layer, each having at least one slit; attaching a second substrate to the first substrate, wherein the first substrate and second substrate face each other, the second substrate having a second common electrode formed to correspond only to each W sub-pixel; and forming a liquid crystal layer between the first and second substrates.

In this manner, the present invention is characterized in that the wide and narrow viewing angles are controlled by means of the white sub-pixel among the RGBS-4 sub-pixels, in which, with the second common electrode introduced only into each W sub-pixel on the second substrate (a color filter array substrate), a voltage is applied in such a way that, for the case of wide viewing angle, the second common electrode of the second substrate is supplied with the same level of voltage as that of the first common electrode of the first substrate (thin film transistor array substrate) or is not supplied with any voltage to make it in a floating state, and in the case of narrow viewing angle, an electric field difference of about 1~4 V or about −4~−1 V is induced between the second common electrode of the second substrate and the first common electrode of the first substrate.

That is, in the LCD device in which one pixel is constituted by RGBW four sub-pixels, the RGB sub-pixels are always driven in the FES mode, whereas the W sub-pixel is driven in the FFS mode for the wide viewing angle, thereby increasing a viewing angle, and generates the vertical electric field for the narrow viewing angle, thereby reducing the viewing angle.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 3:
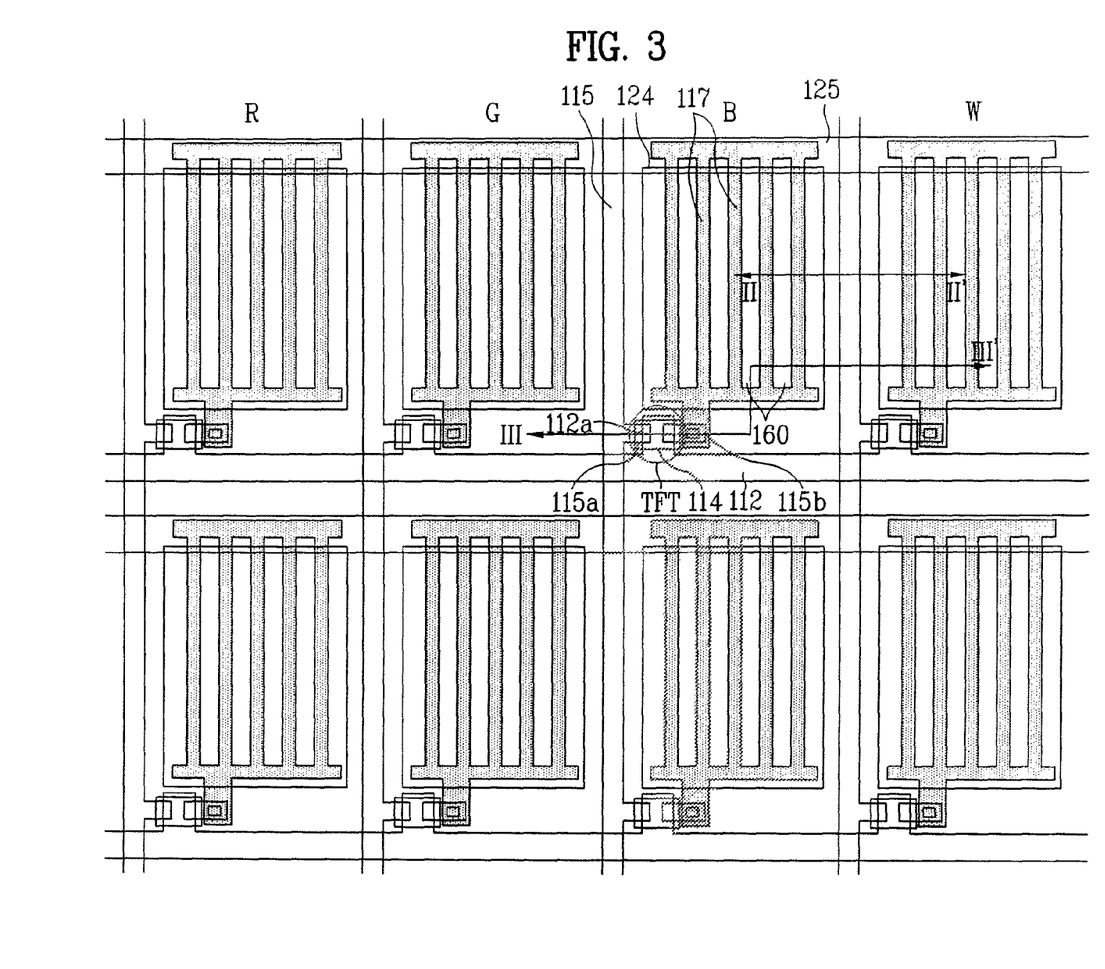
FIG. 3 is a plan view illustrating an FFS mode type liquid crystal display device in accordance with the present invention.
Figure 4:
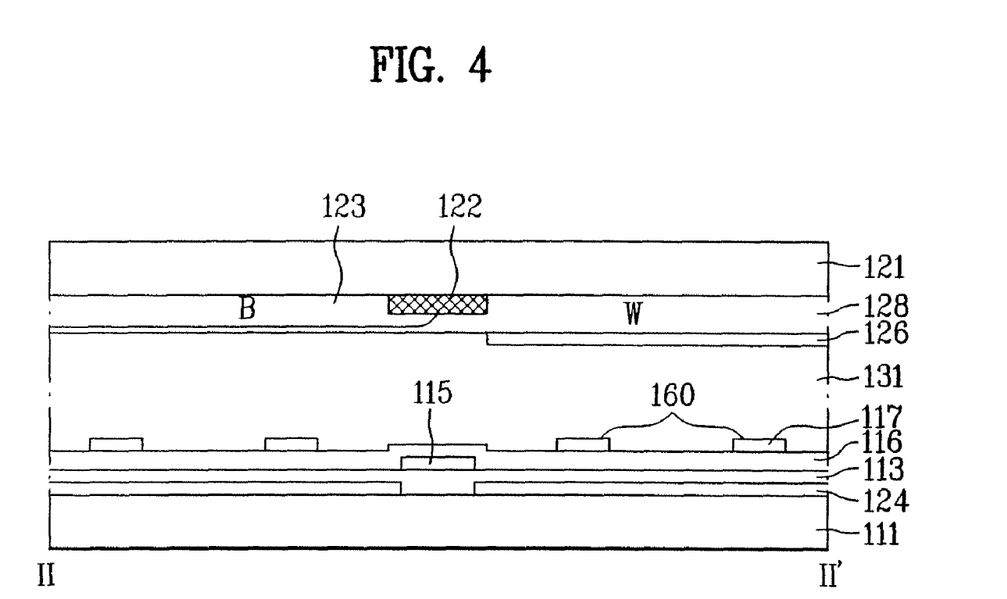
FIG. 4 is a cross-sectional view taken along line II-II' of FIG. 3.
Figure 5:
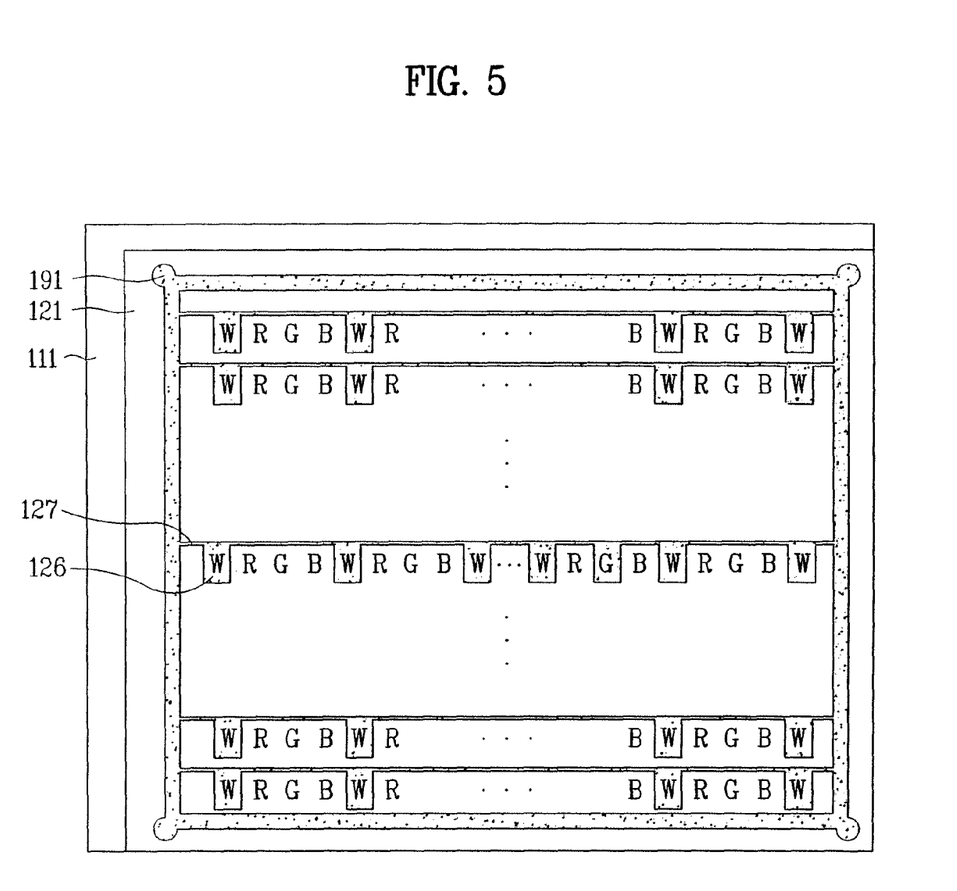
FIG. 5 is a view illustrating patterns on a color filter array substrate in accordance with the present invention.

FIG. 3 is a plan view illustrating an FFS mode type LCD device according to the present invention, FIG. 4 is a cross-sectional view taken along line II-II' of FIG. 3, and FIG. 5 is a view illustrating patterns on a color filter array substrate according to the present invention.

Figure 6A:
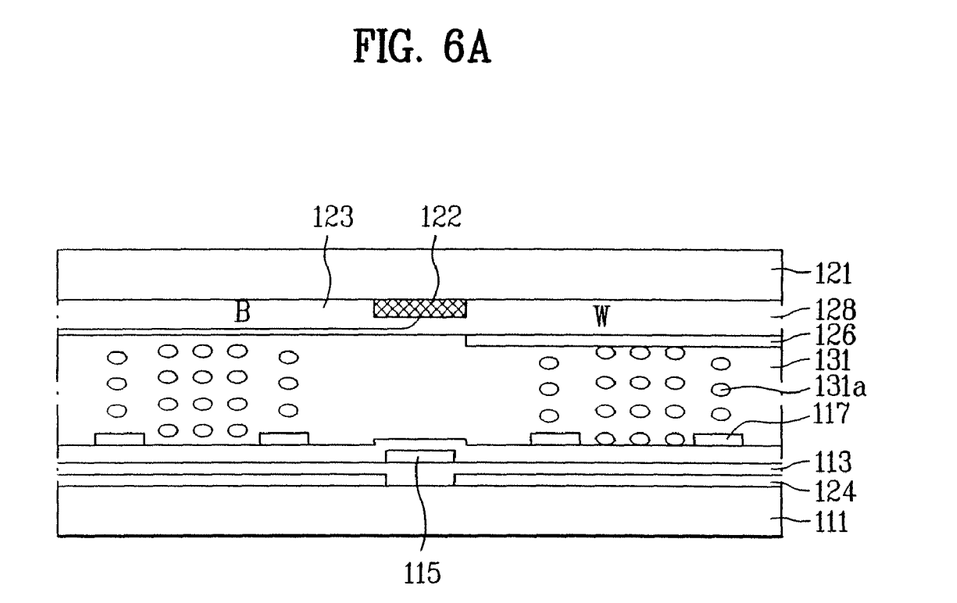
FIGS. 6A and 6B are cross-sectional views illustrating a mode for a wide viewing angle of the LCD device in accordance with the present invention.
Figure 6B:
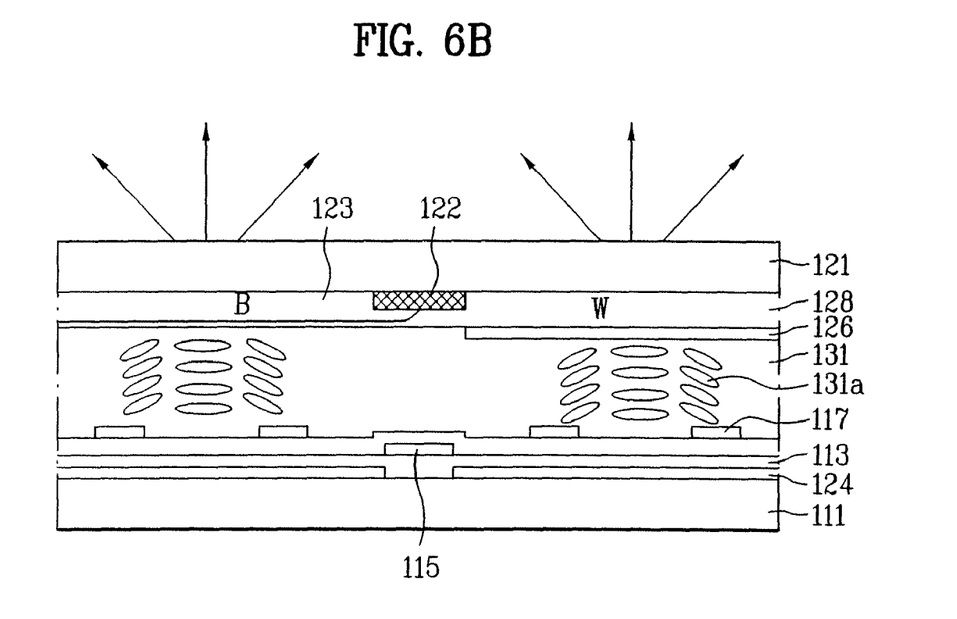
Figure 7A:
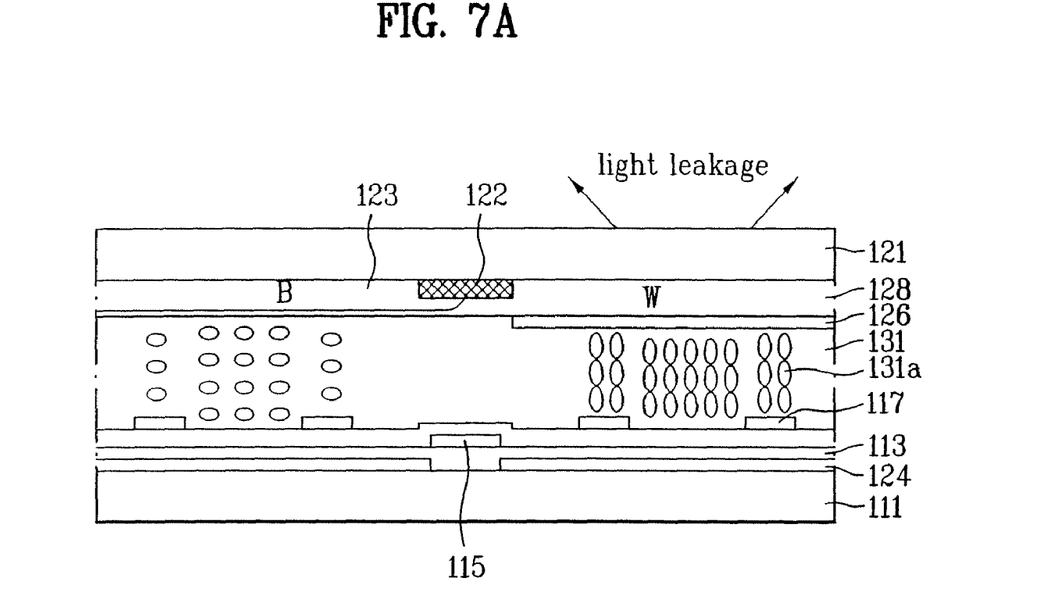
FIGS. 7A and 7B are cross-sectional views illustrating a mode for a narrow viewing angle of the LCD device in accordance with the present invention.
Figure 7B:
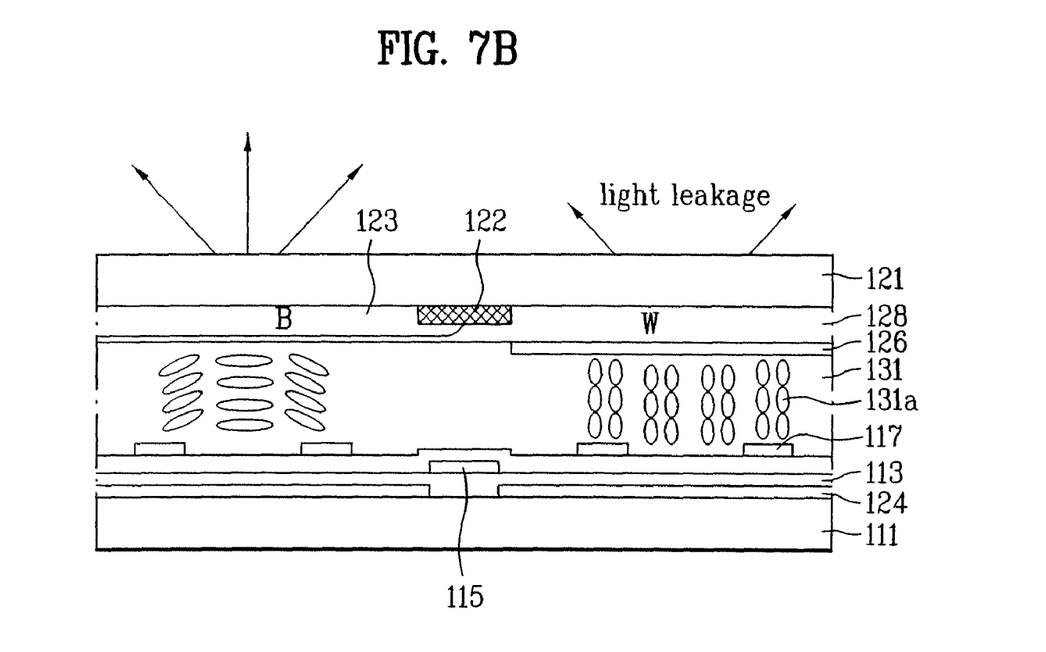

In addition, FIGS. 6A and 6B are cross-sectional views illustrating a mode for a wide viewing angle of the LCD device according to the present invention, FIGS. 7A and 7B are cross-sectional views illustrating a mode for a narrow viewing angle of the LCD device according to the present invention, and FIGS. 8A to 8D are cross-sectional views illustrating manufacturing steps taken along lines III-III' of FIG. 3.

In FIGS. 3 and 4, the LCD device according to the invention is constituted by a TFT array substrate 111 and a color filter array substrate 121 assembled to face each other with a liquid crystal layer 131 interposed therebetween. The TFT array substrate 111 is formed with a thin film transistor formed in each of RGBW sub-pixels to act as a switching element, and with first common electrodes 124 and pixel electrodes 117 to form a fringe field. The color filter array substrate 121 is formed with a second common electrode 126 only for each W sub-pixel to control a viewing angle.

In other words, the RGB sub-pixels are adapted to allow fringe field to be generated therein, and are driven in the FFS mode irrespective of the wide viewing angle or the narrow viewing angle, and each W sub-pixel serves as a viewing angle control sub-pixel which can control the wide viewing angle and the narrow viewing angle. For the case of wide viewing angle mode, each W sub-pixel is driven in the same FFS mode as that of the RGB sub-pixels, thereby increasing the viewing angle, and for the case of narrow viewing angle mode, a vertical electric field is generated in each W sub-pixel, thereby reducing the contrast ratio and the viewing angle.

Here, according to an arranging manner of the RGBW sub-pixels, the LCD device can be classified into a quad type LCD device wherein the RGBW sub-pixels are arranged in a square shape to form one pixel with sub-pixels of a 2×2 structure, and a stripe type LCD device wherein the RGBW sub-pixels are sequentially arranged to form one pixel with four sub-pixels.

More specifically, on the TFT array substrate 111, the RGBW sub-pixels are defined by gate lines 112 and data lines 115 insulated from each other via a gate insulation film 113 while vertically crossing each other to define a thin film transistor at each crossing portion thereof. Each sub-pixel is formed therein with the first plate-shaped common electrode 124 formed and to which a $V_{com}$ signal is applied, and a pixel electrode 117 having a plurality of slits 160 insulated from the first common electrode 124 and brought into contact with a drain electrode 115b of the thin film transistor such that a pixel signal is applied to the pixel electrode 117. A fringe field is created between the first common electrode and the pixel electrode via the slits 160, and drives the liquid crystal layer 131.

The first common electrodes 124 and the pixel electrodes 117 are formed by depositing and patterning a transparent conductive material such as ITO (Indium Tin Oxide) or IZO (Indium Zinc Oxide). Here, the first common electrodes 124 may be formed under the gate lines or on the data lines. If the first common electrodes 124 are formed on the data lines, they are formed to be insulated from the pixel electrodes via the insulation film.

The slits 160 of each pixel electrode are formed such that a longitudinal axis thereof is disposed in a direction of the gate lines or the data lines. The slits 160 of the pixel electrode can be disposed in the direction of the data lines in order to narrow a right and left viewing angle. In this regard, it is necessary to dispose the slits of the pixel electrode in the same direction with respect to all the RGBW sub-pixels.

Each of the first common electrodes 124 is brought into contact with a first common line 125 to receive the Vcom signal, in which the first common line 125 is formed in parallel to the gate lines to receive the $V_{com}$ signal from a region outside an active region.

Each of the pixel electrodes 117 is brought into contact with the drain electrode 115b of the thin film transistor through the passivation layer 116, and receives the pixel signal.

Meanwhile, each of thin film transistors serves as a switching element to control the on/off of a voltage. Each thin film transistor comprises a gate electrode 112a branched from an associated gate line 112, the gate insulation film 113 formed over the whole surface including the gate lines 112, a semiconductor layer 114 formed by depositing noncrystalline silicon (a-Si) on the gate insulation film above the gate electrode, and source/drain electrodes 115a and 115b branched from an associated data line 115 while being formed on the semiconductor layer in order to serve as the switching element for controlling on/off of the voltage.

The TFT array substrate 111 is attached to the color filter array substrate 121 so as to face each other with the liquid crystal layer 131 interposed therebetween. The color filter array substrate 121 comprises black matrices 122 partitioning the R, G and B layers from each other while shielding light, color filter layers 123 of red, green, blue and white arranged in a predetermined pattern to realize red, green, blue and white, and a second common electrode 126 only for each of the W sub-pixels to control a viewing angle of the W sub-pixel. The second common electrode 126 is formed in a plate shape of a transparent material, and formed to correspond only to each W sub-pixel.

Here, it is necessary for the second common electrode 126 to receive a different $V_{com}$ signal than that of the first common electrode 124 on the TFT array substrate. To this end, as shown in FIG. 5, a second common line 127 is further added to integrally connect the second common electrodes 126 corresponding to the W sub-pixels with each other. The second common line 127 is extended to a region outside the active region. The second common line 127 is formed along an edge of the pixel region so as not to shield a region where an image is displayed, and can be formed in parallel to the gate lines. In order to apply the $V_{com}$ signal to the second common line 127, the second common line 127 must be connected with an external driving circuit of the first substrate. Connection between the second common line 127 and the first substrate is via silver dots 191, which are disposed at corners of a panel, and electrically connect the upper and lower substrates.

Meanwhile, RGBW colors constituting the color filter layers are independently driven to exhibit color of one pixel via combination thereof. Here, each W sub-pixel realizes W color without forming a resist as the W color filter layer. Alternatively, the W color filter layer of W sub-pixel is formed using a resist, which is not mixed with pigments of RGB, along with the RGB sub-pixels in a process of forming the RGB-color filter layers.

If the process of forming the color filter layers is not performed to the W sub-pixels, each of the W sub-pixels has a different step from that of the RGB sub-pixels. In this regard, an overcoat layer 128 is evenly formed on an entire surface including the color filter layers to solve the problem of a non-uniform step over the substrate. At this time, the second common electrode 126 is formed on the overcoat layer 128 of each W sub-pixel.

As such, the LCD device according to the present invention comprises the W sub-pixels for a white pattern, which do not comprise pigment, as well as the RGB sub-pixels so as to constitute one pixel with the RGBW sub-pixels. Here, the color filter layers are formed such that the RGB sub-pixels contain the pigments, thereby lowering the transmittance, and the W sub-pixel does not contain the pigment, enhancing the transmittance of the whole pixel.

Meanwhile, the LCD device further comprises an orientation film respectively formed on the inner surfaces of the TFT array substrate and the color filter array substrate to arrange liquid crystal molecules in a desired direction at an initial state, and upper and lower polarization plates respectively attached to the outer surfaces of the color filter array substrate and the TFT array substrate to polarize light. The lower polarization plate is attached to the outer surface of the TFT array substrate, and the upper polarization plate is attached to the outer surface of the color filter array substrate such that a polarization axis of the lower polarization plate is orthogonal to that of the upper polarization plate, with the orientation film disposed substantially parallel to the polarization axis of one of the upper and lower polarization plates.

In the drawings, the orientation film provided inside the TFT array substrate is disposed substantially parallel to the polarization axis of the upper polarization plate, so that the liquid crystals are arranged at an initial state in the longitudinal direction of the slits of the pixel electrode.

The LCD device according to the present invention is characterized in that the RGB sub-pixels exhibit the same transmittance via application of the same voltage (FFS mode driving voltage) thereto irrespective of the wide viewing angle and the narrow viewing angle, and the W sub-pixels control the viewing angle via application of different voltages for the wide viewing angle and the narrow viewing angle, respectively.

First, when driving the LCD device in a wide viewing angle mode, all the RGBW sub-pixels are driven in the FFS mode. In this regard, as shown in FIG. 6A, when no voltage is applied to the first common electrode 124 and the pixel electrode 117, liquid crystal molecules 131a maintain an initial arrangement state so that incident light entering through the polarization axis of the lower polarization plate orthogonal to an initial arrangement direction of the liquid crystal molecules does not pass through the liquid crystal layer 131, thereby realizing a black state.

Next, as shown in FIG. 6B, if a $V_{com}$ voltage is applied to the first common electrode 124 and a pixel voltage is applied to the pixel electrode 117, a fringe field is formed between the first common electrode 124 and the pixel electrode 117 so that the liquid crystal molecules 131a move in the horizontal direction by the fringe field. Accordingly, light entering through the polarization axis of the lower polarization plate passes through the polarization axis of the upper polarization plate via the liquid crystal layer, thereby realizing a white state.

At this time, in order to prevent the second common electrode 126 of each W sub-pixel from participating in formation of the fringe field, it is necessary to make the second common electrode 126 have a floating state wherein no voltage is applied thereto, or to apply the same voltage as that of the first common electrode 124 thereto, thereby substantially preventing the vertical electric field from being created in the second common electrode.

In this manner, when the LCD device is driven in the mode for the wide viewing angle, the W sub-pixel is also operated in the FFS mode together with the RGB sub-pixels, thereby satisfying compensation effect for white brightness while realizing the wide viewing angle.

When driving the LCD device in a narrow viewing angle mode, the RGB sub-pixels are operated in the FFS mode, whereas the W sub-pixel simply serves to control the viewing angle and does not serve as a brightness compensation pixel. In this case, unlike the case of the wide viewing angle mode, the second common electrode 126 participates in formation of the electric field.

First, as shown in FIG. 7A, when a predetermined voltage is applied to the second common electrode 126 of each W sub-pixel to form the vertical electric field between the second common electrode 126 and the first common electrode 124 of the W sub-pixel without applying any voltage to the pixel electrode 117 and the first common electrode 124 of the RGB sub-pixels, liquid crystal molecules 131a in the RGB sub-pixels maintain the initial arrangement state so that incident light entering through the polarization axis of the lower polarization plate orthogonal to the initial arrangement direction of the liquid crystal molecules does not pass through the liquid crystal layer 131, thereby realizing the black state.

In addition, the liquid crystal molecules 131a in the W sub-pixel are tilted in the vertical direction by the vertical electric field formed between the first common electrode 124 and the second common electrode 126 so that light cannot be observed therethrough. In other words, light is not observed in front of the W sub-pixel irrespective of the white state or the black state, there occurs light leakage in right and left viewing angles of the W sub-pixel. That is, since the vertical electric field is formed only in the W sub-pixel and there occurs light leakage in right and left viewing angles, the narrow viewing angle is realized in the black state.

In conclusion, it is possible to observe a great amount of light leaked in the directions of the right and left viewing angles in the black state. In view of the fact that four sub-pixels constitute one pixel, when a user observes the panel in directions of the right and left viewing angles, black brightness is rapidly increased, causing the contrast ratio to decrease. Thus, the viewing angle of the device become narrow.

Meanwhile, if the $V_{com}$ voltage is applied to the first common electrode 124 of the RGB sub-pixels, and a pixel voltage is applied to the pixel electrode 117 thereof while applying a predetermined voltage to the second common electrode 126 of the W sub-pixel so as to form the vertical electric field between the second common electrode 126 and the first common electrode 124, the fringe field is formed between the first common electrode 124 and the pixel electrode 117 of the RGB sub-pixels, as shown in FIG. 7B.

Therefore, the liquid crystal molecules 131a in the RGB sub-pixels move in the horizontal direction by the fringe field. Accordingly, light entering through the polarization axis of the lower polarization plate passes through the liquid crystal layer 131, thereby realizing the white state. In addition, the liquid crystal molecules 131a in the W sub-pixel are tilted in the vertical direction by the vertical electric field formed between the first common electrode 124 and the second common electrode 126, and prevent light from passing therethrough. In this case, although light is not observed in front of the W sub-pixel, there also occurs light leakage in the directions of the right and left viewing angles from the W sub-pixel, thereby reducing the viewing angle. That is, the narrow viewing angle is realized in the white state by forming a horizontal electric field for the RGB sub-pixels while forming the vertical electric field for the W sub-pixel.

At this time, in order to realize the narrow viewing angle, the pixel electrode 117 of the W sub-pixel is supplied with a pixel voltage the same as the $V_{com}$ voltage applied to the first common electrode 124 or less than a threshold voltage. In addition, the first common electrode 124 is supplied with the same voltage as that in the wide viewing angle mode, and the second common electrode 126 is supplied with a voltage such that an electric field difference of about 1-4 V or about −4--1 V is induced between the second common electrode 126 and the first common electrode 124. The voltage applied to the second common electrode 126 may be either DC or AC voltage.

In this manner, in the LCD device according to the present invention, when realizing the wide viewing angle, all the RGBW sub-pixels are operated in the FFS mode. On the contrary, when realizing the narrow viewing angle, the RGB sub-pixels are operated in the FFS mode, and the W sub-pixel is operated to form the vertical electric field between the first and second substrates so that the liquid crystal molecules therein are tilted instead of being twisted, thereby preventing light from being transmitted through the W sub-pixel.

A method for manufacturing a liquid crystal display device will be described in detail as follows.

Figure 8A:
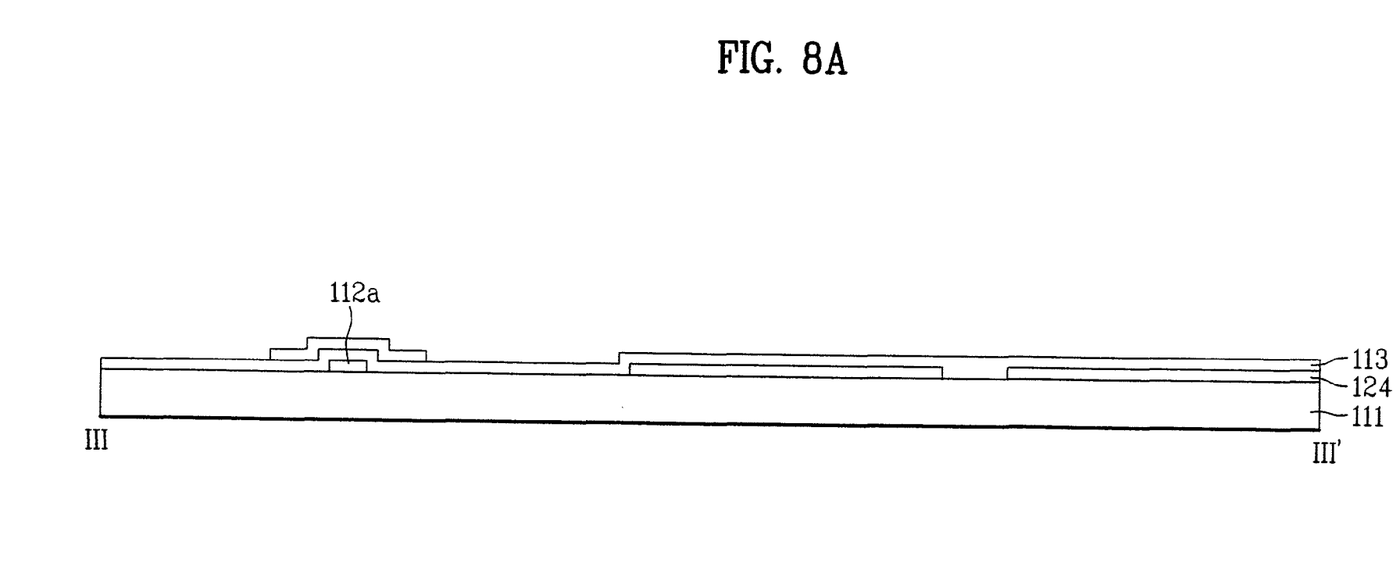
FIGS. 8A to 8D are cross-sectional views illustrating manufacturing steps taken along lines III-III' of FIG. 3.

First, in FIG. 8A, a transparent conductive material such as ITO (Indium Tin Oxide) or IZO (Indium Zinc Oxide) is deposited on a dielectric substrate 111, and patterned to remain in W sub-pixels, thereby forming first plate-shaped common electrodes 124.

Then, gate lines 112 (see FIG. 3), gate electrodes 112a, and first common lines 125 (see FIG. 3) are formed by depositing metal having a low specific resistance, such as copper (Cu), aluminum (AL), aluminum alloy (AlNd), molybdenum (Mo), molybdenum-tungsten alloy (MoW), etc. over the entire surface including the first common electrodes 124, followed by patterning.

At this time, the first common lines 125 are formed in parallel to the gate lines 112 while being brought into contact with the first common electrodes 124. The first common lines are extended to a region outside an active region, and connected with an external driving circuit of the TFT array substrate.

Although the first common electrodes 124 are described above as being formed before forming the gate lines 112, the present invention is not limited to this process, and the first common electrodes 124 may be formed after forming the gate lines 112 or after forming data lines 115.

Next, after a gate insulation film 113 is formed by depositing an inorganic insulation material such as a silicon oxide (SiO.) or a silicon nitride (SiN.) over the entire surface including the gate electrodes 112a via plasma enhanced chemical vapor deposition (PECVD), amorphous silicon is deposited over the entire surface including the gate insulation film 113, followed by patterning via a photolithography process to form a semiconductor layer 114 over the gate electrodes 112a.

Figure 8B:
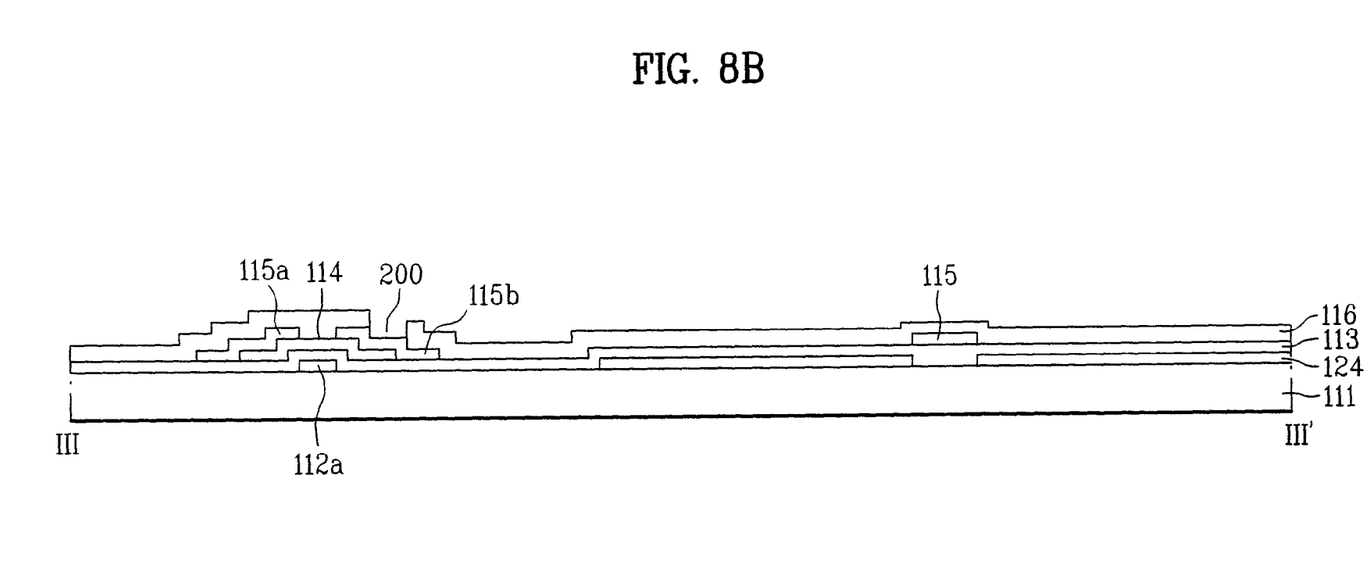

Next, as shown in FIG. 8B, data lines 115 and source/drain electrodes 115a and 115b are formed by depositing metal having a low resistance, such as copper (Cu), aluminum (AL), aluminum alloy (AlNd), molybdenum (Mo), molybdenum-tungsten alloy (MoW), etc. over the entire surface including the semiconductor layer 114, followed by patterning.

At this time, the data lines 115 cross with the gate lines 112 to define RGBW sub-pixels, and the source/drain electrodes 115a and 115b are formed to overlap with both ends of the semiconductor layer 114, thereby completing thin film transistors.

Then, a passivation layer 116 is formed by depositing an inorganic material such as a silicon oxide, a silicon nitride and the like over the entire surface including the data lines 115 or by applying an organic material such as Benzocyclobutene (BCB), acryl resin and the like thereto. Next, a contact hole 200 is formed by selectively removing the passivation layer 116 such that the drain electrode of each thin film transistor is exposed.

Figure 8C:
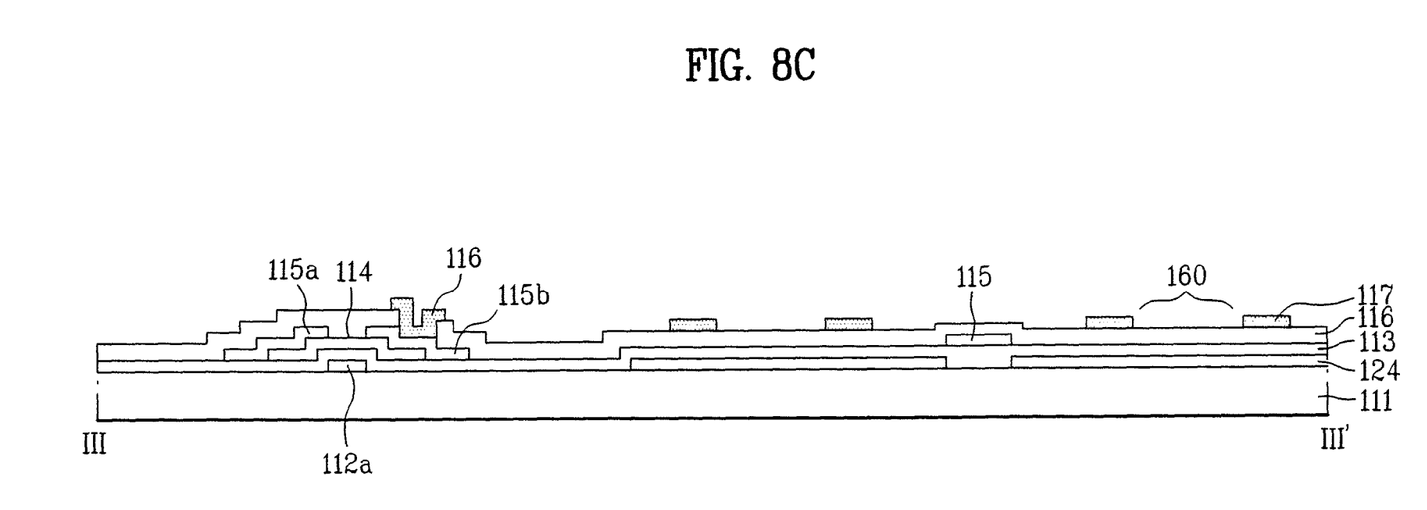

Subsequently, as shown in FIG. 8C, pixel electrodes 117, each having a plurality of slits 160, are formed by depositing a transparent conductive material such as ITO or IZO over the entire surface including the passivation layer 116, followed by patterning. At this time, the pixel electrodes 117 formed in the respective sub-pixels are integrally connected with each other, and brought into contact with the drain electrode 115b via the contact hole 200 (see FIG. 8B).

Figure 8D:
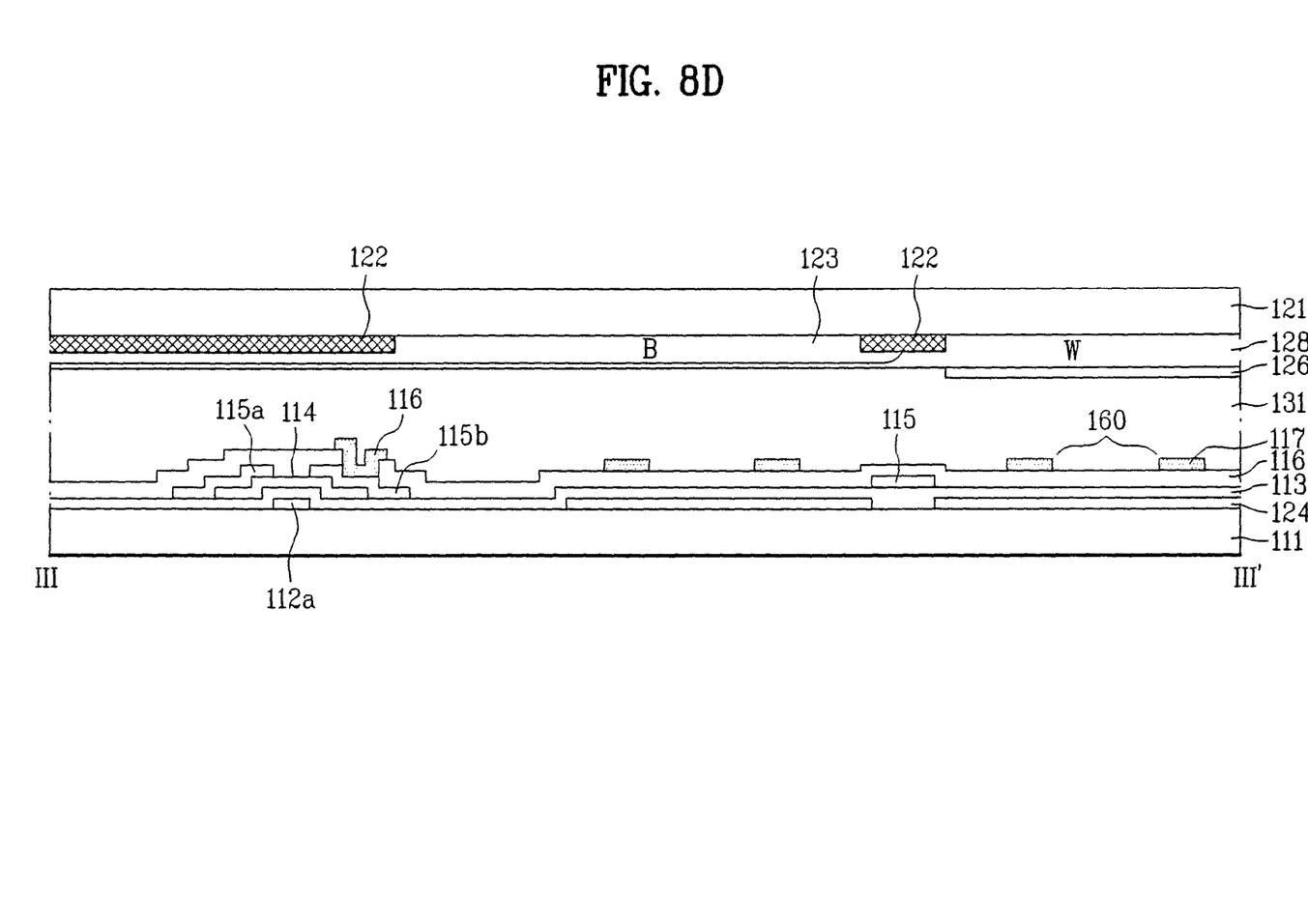

Next, as shown in FIG. 8O, black matrices 122, color filter layers 123, an overcoat layer 128, and second common electrodes 126 are formed on a color filter array substrate 121 as follows. First, the black matrices 122, are formed by depositing a material having a high reflectance such as Cr on the color filter array substrate 121, and patterning the material so it remains at a site where light leakage occurs, for example, at an edge of each sub-pixel and at a site of each thin film transistor.

Subsequently, a color resist containing pigments is applied to the entire surface including the black matrices 122, and patterned to form color filter layers 123. Typically, an R-color filter layer is formed in the R sub-pixel through deposition and patterning of a red color resist, a G-color filter layer is formed in the G sub-pixel through deposition and patterning of a green color resist, and then a B-color filter layer is formed in the B sub-pixel through deposition and patterning of a blue color resist.

Next, the overcoat layer 128 is formed by flatly applying an organic material such as acryl resin over the entire surface including the RGB-color filter layers 123. Since the overcoat layer 128 does not contain pigment, it exhibits white color in the W sub-pixel. Although it is possible to form a separate W-color filter layer via application and patterning of a white color resist during formation of the color filter layers, the overcoat layer 128 formed in the W sub-pixel may be used in place of the W-color filter layer.

Next, a transparent conductive material such as ITO or IZO is deposited over the entire surface including the overcoat layer 128, and patterned to form the second common electrode 126 only in each W sub-pixel. The second common electrode 126 is provided for the purpose of controlling a viewing angle, and has the same size substantially as that of the W sub-pixel.

Simultaneously, a second common line 127 (see FIG. 5) is formed to integrally connect the second common electrodes 126 with each other. Here, the second common line 127 is extended to a region outside the active region, and is electrically connected with an external driving circuit of the TFT array substrate via silver dots 191 (see FIG. 5), which are disposed at corners of a panel in a following process.

Finally, after applying a sealing material along an edge of the thin film transistor array substrate, and dispersing spacers on the active region, the color filter array substrate 121 is assembled to the TFT array substrate 111 to face each other, and a liquid crystal layer 131 is formed between these substrates, completing the LCD device according to the invention.

As apparent from the above description, the liquid crystal display device and the method for manufacturing the same according to the invention have advantageous effects as follows.

First, a white sub-pixel among RGBW-4 sub-pixels can be driven in the same FFS mode as that of the adjacent RGB sub-pixels for a wide viewing angle mode, thereby widening the viewing angle while compensating white brightness, and is driven in an mode different from that of the adjacent RGB sub-pixels to form a vertical electric field for a narrow viewing angle mode, thereby lowering the viewing angle so as to protect private information.

Secondly, according to the present invention, since the common electrode is added only to an upper plate of each W sub-pixel, additional manufacturing costs are lowered, and the process is simple in comparison to a related technique of controlling the viewing angle.

Additionally, the common electrode added to the upper plate is floated or supplied with the same voltage as that of another common electrode added to a lower plate in the wide viewing angle mode, and is driven to have a predetermined voltage difference between the upper and lower plates in the narrow viewing angle mode, thereby allowing easy driving of the LCD device.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A method for manufacturing a liquid crystal display device, comprising:

forming first common electrodes on a first substrate;

forming gate lines and data lines to cross each other to define RGBW sub-pixels on the first substrate;

forming a thin film transistor at each crossing of the gate and data lines;

forming a passivation layer on an overall surface of the first substrate including the thin film transistor;

forming pixel electrodes on the passivation layer, each pixel electrode having at least one slit;

forming black matrices on a second substrate;

forming RGBW color filter layers above the black matrices corresponding to respective RGBW sub-pixels;

forming an overcoat layer on an overall surface of the second substrate including the color filter layers;

the forming the second common electrodes on the overcoat layer to correspond only to each W sub-pixel;

attaching a second substrate to the first substrate, wherein the first and second substrate face each other; and forming a liquid crystal layer between the first and second substrates.

2. The method according to claim 1, wherein each W color filter layer is formed at a same time with the forming of the overcoat layer.

3. The method according to claim 2, wherein the W color filter layer and the overcoat layer are formed of a same material.

4. The method according to claim 1, wherein the second common electrodes are formed of a transparent conductive layer.

5. The method according to claim 4, wherein the second common electrodes are formed of either ITO or IZO.

6. The method according to claim 1, wherein each of the second common electrodes has substantially a same size as that of the W sub-pixel.

7. The method according to claim 1, further comprising:
forming a second common line connecting the second common electrodes, at the forming of the second common electrodes wherein the second common line extends to a region outside an active region.

8. The method according to claim 7, further comprising:
arranging the second common line to contact the silver dots formed at corners of a panel to be electrically connected with a driving circuit of the first substrate.

9. The method according to claim 1, further comprising:
forming a first common line that contacts the first common electrodes at the forming of the gate lines.

* * * * *